US008528390B2

(12) United States Patent
Von Meduna et al.

(10) Patent No.: US 8,528,390 B2
(45) Date of Patent: Sep. 10, 2013

(54) METHOD FOR METERING A REAGENT INTO AN EXHAUST GAS DUCT AND DEVICE FOR CARRYING OUT THE METHOD

(75) Inventors: Dirk Von Meduna, Stuttgart (DE); Matthias Kruse, Stuttgart-Vaihingen (DE); Matthias Burger, Murr (DE); Franz-Josef Trompeter, Freiberg Am Neckar (DE); Markus Buerglin, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 239 days.

(21) Appl. No.: 13/181,640

(22) Filed: Jul. 13, 2011

(65) Prior Publication Data

US 2012/0017571 A1 Jan. 26, 2012

(30) Foreign Application Priority Data

Jul. 26, 2010 (DE) .......................... 10 2010 038 394

(51) Int. Cl.
*G01M 15/10* (2006.01)
(52) U.S. Cl.
USPC ....................................... 73/114.75
(58) Field of Classification Search
USPC .............. 73/114.69, 114.71, 114.74, 114.75, 73/114.76
See application file for complete search history.

(56) References Cited

U.S. PATENT DOCUMENTS

| 7,617,674 | B2* | 11/2009 | Gerlach | 60/286 |
| 8,104,268 | B2* | 1/2012 | Gerlach | 60/286 |
| 8,132,449 | B2* | 3/2012 | Hartimath et al. | 73/114.69 |
| 2003/0033799 | A1 | 2/2003 | Scheying | |
| 2006/0086084 | A1* | 4/2006 | Gerlach | 60/286 |
| 2007/0209349 | A1 | 9/2007 | Ripper et al. | |
| 2007/0234709 | A1* | 10/2007 | Bork | 60/282 |
| 2009/0188309 | A1* | 7/2009 | Hartimath et al. | 73/114.76 |
| 2009/0192732 | A1* | 7/2009 | Huebner | 702/50 |

* cited by examiner

*Primary Examiner* — Eric S McCall
(74) *Attorney, Agent, or Firm* — Michael Best & Friedrich LLP

(57) ABSTRACT

The invention proposes a method for metering a reagent, in which the reagent is sprayed into a spray tube (12) via an electrically activated metering valve (24), and is mixed in the spray tube (12) with compressed air, and in which the reagent mixed with compressed air is introduced by means of the spray tube (12) into an exhaust gas duct (10) and is atomized, and a device for carrying out the method. The procedure according to the invention is distinguished in that the duration of the metering valve activation signal (34) is corrected depending on the differential pressure between the hydraulic pressure (p_Rea_hyd) of the reagent in the metering valve (24) and the pneumatic pressure (p_D_pneu) in the spray tube (12). The procedure according to the invention permits a high degree of accuracy in the metering of the reagent.

10 Claims, 2 Drawing Sheets

METHOD FOR METERING A REAGENT INTO AN EXHAUST GAS DUCT AND DEVICE FOR CARRYING OUT THE METHOD

BACKGROUND OF THE INVENTION

The invention is based on a method for metering a reagent into an exhaust gas duct and on a device for carrying out the method.

The present invention also relates to a computer program and to a computer program product.

Laid-open application DE 101 39 142 A1 describes an exhaust gas treatment device of an internal combustion engine, in which, in order to reduce the nitrogen oxide emissions, use is made of an SCR catalytic converter (Selective-Catalytic-Reduction) which reduces the nitrogen oxides contained in the exhaust gas to nitrogen using the reducing agent ammonia. The ammonia is obtained from a urea-water solution in a hydrolysis catalytic converter arranged upstream of the SCR catalytic converter. The hydrolysis catalytic converter converts the urea contained in the urea-water solution with water to form ammonia and carbon dioxide. The urea-water solution is brought by a pump to a predetermined pressure. A metering valve defines a predetermined volumetric flow rate. Compressed air is mixed with the urea-water solution in a mixing chamber. The urea-water solution is sprayed together with the added air by means of a spray tube into the exhaust gas of the internal combustion engine in such a manner that the flow approaching the SCR catalytic converter is as uniform as possible.

Laid-open application DE 10 2004 018 221 A1 describes a method of the type in question and a device of the type in question, in which method and device a pressurized reagent is likewise sprayed into the exhaust gas of an internal combustion engine upstream of an SCR catalytic converter. The reagent pressure is fixed to a predetermined desired reagent pressure depending on a characteristic variable. An operating variable of the internal combustion engine and/or a characteristic variable of the exhaust gas of the internal combustion engine can be used as the characteristic variable. The predetermined desired value of the reagent pressure is controlled within the scope of a closed loop control, in which the actual reagent pressure is detected by a reagent pressure sensor. Compressed air can be added to the reagent. The compressed air pressure can likewise be controlled to a predetermined desired value of the compressed air pressure depending on the characteristic variable within the context of a closed loop control, with the actual compressed air pressure being detected by a compressed air pressure sensor.

The invention is based on the object of specifying a method for metering a reagent into an exhaust gas duct and a device for carrying out the method, the method and device permitting as exact a metering of the reagent as possible in order to avoid both metering of excessive quantities and metering of insufficient quantities.

SUMMARY OF THE INVENTION

The procedure according to the invention for metering a reagent is based on the fact that the reagent is sprayed into a spray tube via an electrically activated metering valve and is mixed in the spray tube with compressed air, and subsequently the reagent mixed with compressed air is introduced by means of the spray tube into an exhaust gas duct, for example of an internal combustion engine, and is atomized. The procedure according to the invention is distinguished in that the duration of the metering valve activation signal is corrected depending on the differential pressure between the hydraulic pressure of the reagent in the metering valve and the pneumatic pressure in the spray tube.

The procedure according to the invention permits the precise maintaining of a required metering quantity of reagent, which is determined, for example, depending on characteristic variables of the combustion process, for example on operating characteristic variables of an internal combustion engine. A substantial advantage is that additional hardware, such as, for example, a pressure sensor, is not required. The procedure according to the invention makes recourse to signals which are known or are simple to detect.

One procedure makes provision for a measure of the differential pressure in the spray tube to be determined with reference to an evaluation of the current of the metering valve activation signal. The current or at least a measure of the current can be detected using simple means in an end stage which activates the metering valve.

According to one refinement, provision is made for the amplitude of the first relative current maximum of the metering valve activation signal after switching on to be detected as a measure of the differential pressure. The duration of the metering valve activation signal can be shortened upon a detected increase in the amplitude.

According to another refinement, provision is made for the duration of the metering valve activation signal from the signal start to the opening of the metering valve to be determined with reference to an evaluation of the current of the metering valve activation signal and to be detected as a measure of the differential pressure. In order to increase the accuracy, the voltage of the metering valve activation signal and the temperature of the metering valve can be taken into consideration, with it being possible to obtain at least one measure of the temperature from the resistance of a magnet coil of the metering valve.

The device according to the invention for carrying out the method relates first of all to a specially designed control unit which contains means for carrying out the method.

The control unit contains in particular a current evaluation means which evaluates the current of the metering valve activation signal, an activation circuit for preparing the activation signal, and a correction device which corrects the metering valve activation signal depending on the differential pressure.

The control unit preferably contains at least one electric memory in which the method steps are deposited in the form of a control unit program.

The computer program according to the invention makes provision for all of the steps of the method according to the invention to be executed when said program runs on a computer.

A computer program product can be provided with a program code stored on a machine-readable carrier, wherein the method according to the invention is executed when the program runs on a computer.

Exemplary embodiments of the invention are illustrated in the drawing and explained in more detail in the description below.

DETAILED DESCRIPTION

Figure 1:
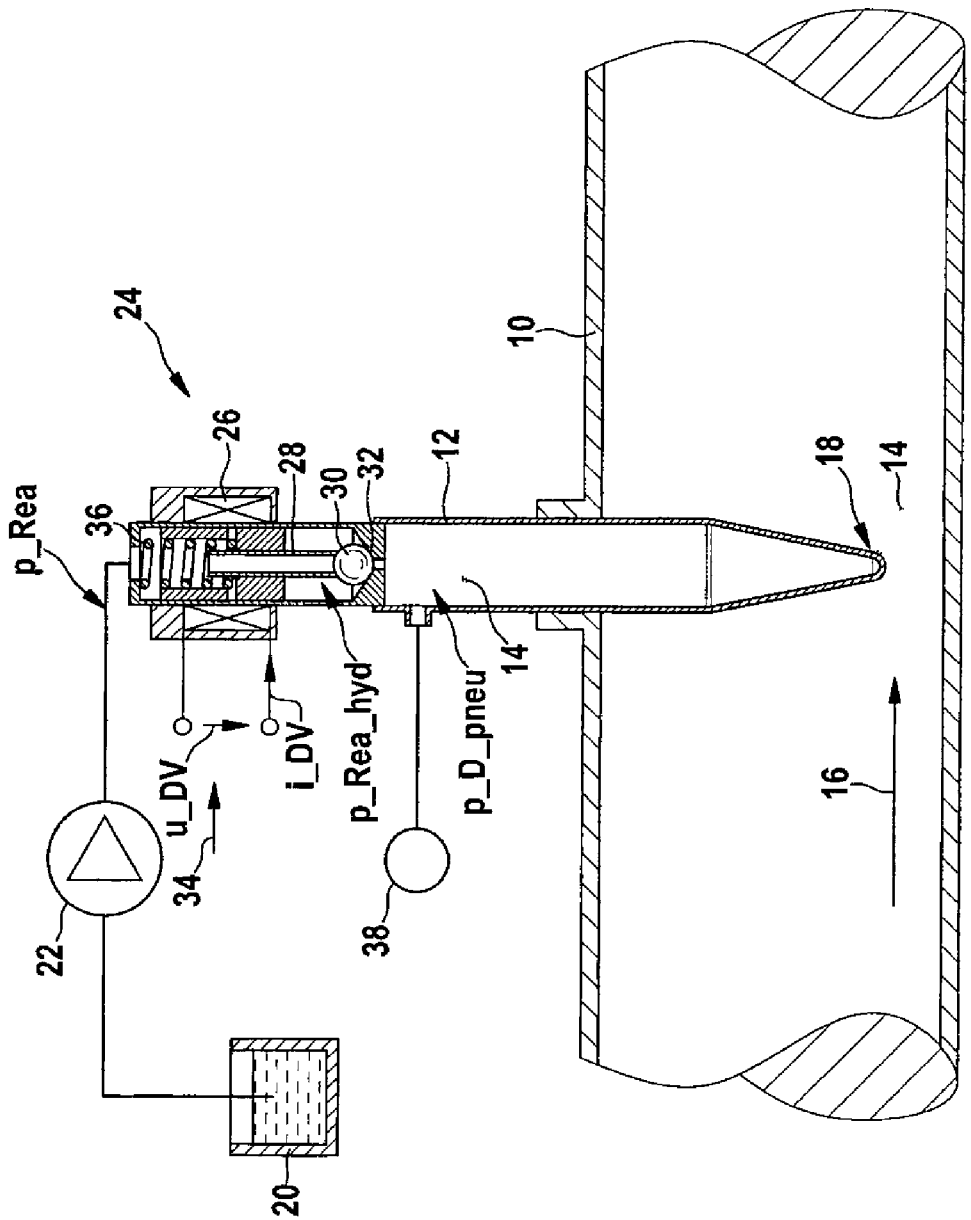
FIG. 1 shows a reagent metering valve, upstream of which a spray tube is arranged.

FIG. 1 shows a spray tube 12 which protrudes into an exhaust gas pipe 10, for example, of an internal combustion engine (not shown specifically) and with which a mixture 14 consisting of compressed air and reagent is introduced into an exhaust gas flow 16. The mixture 14 passes via a cutout 18 in the front region of the spray tube 12, which cutout optionally contains an atomizer, into the exhaust gas pipe 10 and is entrained by the exhaust gas flow 16.

The reagent is, for example, a urea-water solution, with the aid of which the NOx-fractions contained in the exhaust gas flow 16 are converted to N2 and H2O in an SCR catalytic converter (not shown) arranged downstream of the spray tube 12.

The reagent, which is stored in a tank 20, passes via a pump 22, which produces a reagent pressure p_Rea, to a metering valve 24 which is configured as a solenoid valve with a coil 26, in the magnetic field of which an armature 28 with a valve needle 30 is arranged so as to be guided moveably. According to the figure, the valve needle 30 is configured as a ball which opens up or closes a nozzle 32. The coil 26 is activated by a metering valve activation signal 34 at a tension u_DV at which a current i_DV is produced.

In the currentless state of the magnet coil 26, a pretensioning spring 26 presses the armature 28 with the valve needle 30 against the nozzle 32 such that the nozzle 32 is closed. In the closed state, the reagent pressure p_Rea, which can be, for example, within the range of 3-10 bar, occurs in the metering valve 24. If a current i_DV is flowing, the magnetic field of the coil 26 draws the armature 28 with the valve needle 30 back such that the nozzle 32 is opened up and the reagent can be metered into the spray tube 12. In this state, owing to the opening of the nozzle 32, the reagent pressure drops somewhat in comparison to the reagent pressure p_Rea. The reagent pressure which is decisive for the metering quantity in the open state of the metering valve 24 is plotted in the figure and is referred to below as the hydraulic pressure p_Rea_hyd.

The atomizing of the reagent is assisted by compressed air which is metered simultaneously and is provided by a compressed air source 38 with an air pressure p_D such that the mixture 14 consisting of reagent and compressed air arises in the spray tube 12. The air pressure which occurs in the spray tube 12 during the metering and can differ from the air pressure p_D is referred to below as the pneumatic pressure p_D_pneu. It is assumed that the air pressure p_D, and therefore also the pneumatic pressure p_D_pneu, may be subject to considerable fluctuations in the spray tube 12. The air pressure p_D may be, for example, within the range of 5-12 bar.

The nitrogen oxides to be converted are present in the exhaust gas flow 16 at a certain concentration which depends on the combustion process, for example the operating conditions of an internal combustion engine. An optimum operating state is achieved if the metering quantity of the reagent is matched precisely to the requirement in an SCR catalytic converter, in which case a temperature-dependent storage capacity of the SCR catalytic converter should be taken into consideration. Metering of insufficient quantities results in reagent no longer being available to a sufficient extent for conversion and in nitrogen oxides passing into the environment. Metering of excessive quantities increases the consumption of reagent unnecessarily and results in a reagent slip, in which, in the case of urea-water solution as reagent, a slip of pungently smelling, poisonous ammonia would occur.

An as exact as possible maintaining of a metering quantity of the metering valve 24, said metering quantity being determined by a control unit (not shown specifically) and being set via the metering valve activation signal 34, should therefore be maintained. In this connection, the metering quantity of the reagent can be considered as being that quantity which is intended to be metered within a specific period of time, for example within a clock cycle.

In the arrangement shown, the metering quantity depends not only on the hydraulic pressure p_Rea_hyd of the reagent in the metering valve 24 but also on the pneumatic pressure p_D_pneu in the spray tube 12. In more precise terms, the metering quantity depends on the difference between both pressures p_Rea_hyd and p_D_pneu. The dependency of the metering quantity on the pressure ratios is undesirable, since exact metering is then not ensured. Owing to the fact that, according to the invention, the difference between the hydraulic pressure p_Rea_hyd and the pneumatic pressure p_D_pneu in the spray tube 12 is taken into consideration, the predetermined metering quantity can be metered comparatively precisely. Correction takes place over the duration of the metering valve activation signal 34.

Purely in principle, both pressures p_Rea_hyd and p_D_pneu could be measured, in which case in particular the hydraulic pressure p_Rea_hyd could be approximated by the reagent pressure p_Rea or could be determined by means of a correction factor while the pneumatic pressure p_D_pneu would have to be measured, in particular given a variable air pressure p_D.

However, the difference in the pressures p_Rea_hyd and p_D_pneu not only has an influence on the metering quantity but also on the opening force of the metering valve 24. Said influence can be used in order to ascertain the pressure difference. In the case of a solenoid valve, the opening force reacts upon the metering valve activation signal 34.

Figure 2:
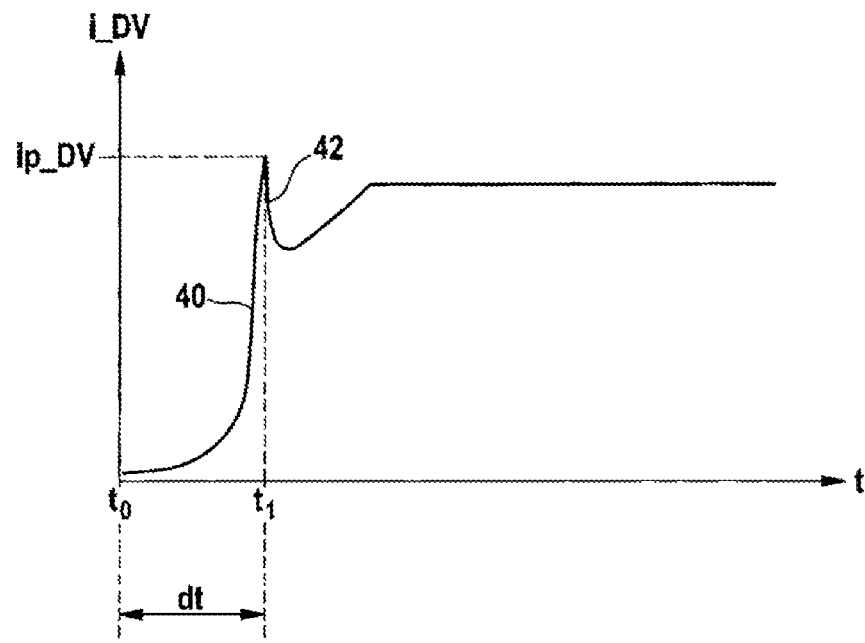
FIG. 2 shows a current profile of a metering valve activation signal over time.

If the differential pressure is low, then the valve needle 32 opens at a low magnetic force. If, by contrast, the differential pressure is great, then a higher force is required. The magnetic force required to open the metering valve 24 can be characterized in turn, according to one exemplary embodiment, via the profile of the current i_DV of the metering valve activation signal 34, which is shown in more detail in FIG. 2, over time. The effects of the difference in force are evident upon opening of the metering valve 24, starting from the start time t0 of the metering valve activation signal 34 as far as the time t1. After the current rise 40, which may be, for example, within the range of 1 A/200 μs, a current maximum ip_DV, which may be, for example, at 1 A, is reached at the first time t1, and then a current drop 42 occurs. The current drop 42 is caused by the change in the inductance of the magnetic circuit, which comprises the armature 28 with the valve needle 30 as well as the coil 36, during the opening operation of the solenoid valve 24. After the current dip, a holding current which preferably lies below the current maximum Ip_DV can be set.

The reaching of the current maximum ip_DV at the first time t1 can be approximately equated with the opening of the metering valve 24. The first time t1 can be determined, for example, by means of a differentiation in the current i_DV. The first deviation supplies the current maximum ip_DV while the curvature is obtained in a known manner by the second deviation in the current i_DV. The maximum ip_DV of the current i_DV is a characteristic measure of the opening force of the metering valve 24.

If the opening force, which mirrors a measure of the difference between the pressures p_Rea_hyd and P_D_pneu, is determined, the duration of the metering valve activation signal 34 can be correspondingly corrected. The metering valve activation signal 34 is corrected here such that, if there is a small difference, corresponding to a small opening force, the duration is fixed to be longer than if there is a greater difference.

Another option for evaluating the current i_DV is possible by determining the characteristic time interval dt between the start time t0 and the opening of the metering valve 24 at the first time t1. The time interval dt is likewise a measure of the difference between the pressures p_Rea_hyd and p_D_pneu. If there is a short time interval dt, corresponding to a small difference, the duration of the metering valve activation signal 34 is increased while the duration is shortened if there is a longer time interval dt.

The voltage u_DV of the metering valve activation signal 34 and/or the temperature of the metering valve 24 are/is preferably taken into consideration in the correction by means of the time interval dt. The temperature influences the resistance of the coil 36 such that the correction on the basis of the temperature can take place via the resistance of the coil 36. The resistance of the coil 36 is ascertained from the voltage u_DV, which is known in an end stage of a control unit, and the current i_DV of the metering valve activation signal 34.

The correction expediently takes place at the beginning of each metering cycle, which begins with an opening operation of the metering valve 24.

Figure 3:
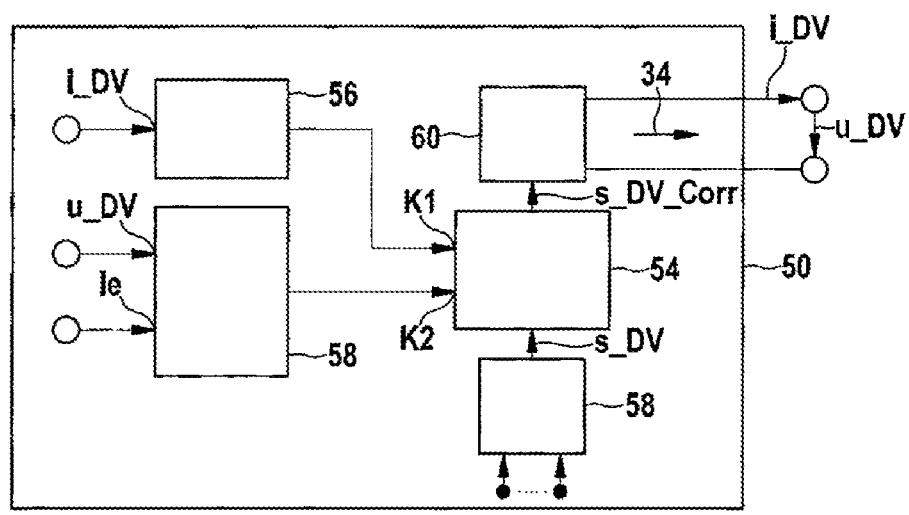
FIG. 3 shows a control unit for carrying out the described procedure.

The control unit 50 shown in FIG. 3 is provided for carrying out the procedure described. The control unit 50 contains a metering signal defining means 52 which defines a metering signal s_DV which is available to a correction device 54. The correction takes place by means of the first correction signal K1 which is determined with the different procedures described by a current evaluation means 56 depending on the current i_DV of the metering valve activation signal 34. A signal evaluation means 58 is optionally provided, said signal evaluation means determining the voltage u_DV of the metering signal activation signal 34 and/or the temperature temp_DV of the metering valve 24 and determining therefrom a second correction signal K2 which is available to the correction device 54 which passes the corrected metering signal s_DV_corr to an end stage 60 which outputs the metering valve activation signal 34.

The end stage 60 provides the metering valve activation signal 34 in such a manner that an opening duration of the metering valve 24 of, for example, 0-98% can occur, in which case the metering frequency can be, for example, within the range of 1-4 Hz, typically at 1 Hz.

The invention claimed is:

1. A method for metering a reagent, in which the reagent is sprayed into a spray tube (12) via an electrically activated metering valve (24), and is mixed in the spray tube (12) with compressed air, and in which the reagent mixed with compressed air is introduced by means of the spray tube (12) into an exhaust gas duct (10) and atomized, characterized in that the duration of a metering valve activation signal (34) is corrected depending on a differential pressure between the hydraulic pressure (p_Rea_hyd) of the reagent in the metering valve (24) and a pneumatic pressure (p_D_pneu) in the spray tube (12).

2. The method according to claim 1, characterized in that a measure of the differential pressure in the spray tube (12) is determined with reference to an evaluation of a current (i_DV) of the metering valve activation signal (34).

3. The method according to claim 2, characterized in that a current maximum (ip_DV) of the metering valve activation signal (34) is determined as a measure of the differential pressure.

4. The method according to claim 3, characterized in that the duration of the metering valve activation signal (34) is shortened as the current maximum (ip_DV) increases.

5. The method according to claim 2, characterized in that the duration (dt) of the metering valve activation signal (34) from a signal start (t0) to an opening time (t1) of the metering valve (24) is determined with reference to an evaluation of the current (i_DV) of the metering valve activation signal (34) and is detected as a measure of the differential pressure.

6. The method according to claim 5, characterized in that a voltage (u_DV) of the metering valve activation signal (34) and at least one measure of a temperature of the metering valve (24) are taken into consideration in the determination of the measure of the differential pressure.

7. The method according to claim 6, characterized in that a resistance of a magnet coil (36) of the metering valve (24) is detected as a measure of the temperature of the metering valve (24).

8. A device for metering a reagent, characterized in that a specially designed control unit (50) containing means (54, 56, 60) for carrying out the method according to claim 1 is provided.

9. The device according to claim 8, characterized in that the control unit (50) contains a current evaluation means (56) which evaluates a current (i_DV) of the metering valve activation signal (34), an end stage (60) for preparing the metering valve activation signal (34), and a correcting device (54) which corrects a duration of the metering valve activation signal (34) depending on the differential pressure.

10. A computer program which executes all of the steps of a method according to claim 1 when the program is run on a computer.

* * * * *